United States Patent Office 3,383,414
Patented May 14, 1968

3,383,414
BENZOCYCLOALKYL SULFAMIDES
William J. Houlihan, Mountain Lakes, N.J., assignor to Sandoz Inc., Hanover, N.J.
No Drawing. Filed Aug. 26, 1964, Ser. No. 392,328
5 Claims. (Cl. 260—556)

ABSTRACT OF THE DISCLOSURE

This disclosure concerns benzocycloalkylsulfamides, e.g., N-(2,4-dichlorobenzyl)-N-1-indanyl sulfamide. These compounds have central nervous system activity.

---

The present invention is directed to four classes of sulfamides of the formulae

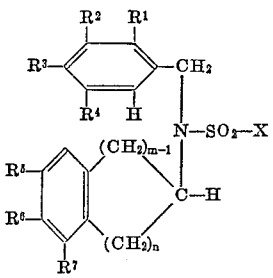

I

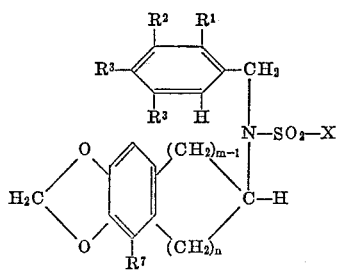

II

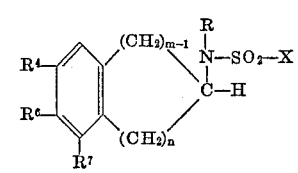

III

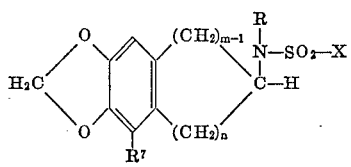

IV

Wherein R is either lower alkyl, e.g. methyl, ethyl, propyl, isopropyl and butyl; a hydrogen atom (—H); allyl (—CH$_2$—CH=CH$_2$); methallyl

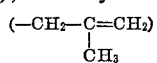

or propargyl (—CH$_2$—CH≡CH);

Each of R$^1$, R$^2$, R$^3$ and R$^4$ is either a hydrogen atom (—H); a chlorine atom (—Cl); a fluorine atom (—F); lower alkyl, e.g. methyl, ethyl, propyl, isopropyl, and butyl; lower alkoxy, e.g. methoxy, ethoxy, propoxy, isopropoxy and butoxy; or trifluoromethyl (—CF$_3$), with the proviso that a plurality of trifluoromethyl groups are not ortho to each other;

Each of R$^5$, R$^6$ and R$^7$ is, independently, either a hydrogen atom (—H); a chlorine atom (—Cl); a fluorine atom (—F); lower alkyl, e.g. methyl, ethyl, propyl, isopropyl and butyl; or lower alkoxy, e.g. methoxy ethoxy, propoxy, isopropoxy and butoxy;

X (for group a) is a primary amino (—NH$_2$);
(For group b) is mono(lower)alkylamino, the alkyl of which is, e.g. methyl, ethyl, propyl, isopropyl and butyl;
(For group c) is di(lower)alkylamino, each alkyl of which is, independently, e.g., methyl, ethyl, propyl, isopropyl and butyl;
(For group d) is polymethyleneimino

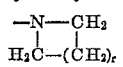

having from 4 to 6 ring carbon atoms;
(For group e) is oxapolymethyleneimino

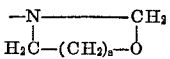

having from 3 to 5 ring carbon atoms;
(For group f) is thiapolymethyleneimino

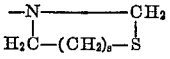

having from 3 to 4 ring carbon atoms; and
(For group g) is polymethylenediimino

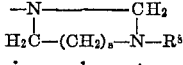

having from 3 to 5 ring carbon atoms;
R$^8$ is either a hydrogen atom (—H) or lower alkyl, e.g. methyl, ethyl, propyl, isopropyl and butyl;
r is one of the integers 2, 3 and 4;
s is one of the integers 1, 2 and 3;
m (for subclass A) is one;
(For subclass B) is two; and
n (for subclass 1) is one or two, the sum of m plus n being at least 3;
(For subclass 2) is three;
(For subclass 3) is four.

The scope of this invention includes four distinct classes of compounds, each one of which has separate subclasses. Since each subclass can have for substituent X any member of seven groups of substituents, it is possible only to exemplify the various areas. All compounds of this invention are prepared in the same manner as set forth in detail in the specific working examples. To illustrate the scope of the invention, however, four tables, one for each class of compounds, are provided. In these tables the following symbols are used for convenience:

Me—methyl     Bu—butyl
Et—ethyl     Al—allyl
Pr—propyl     Pp—propargyl
iPr—isopropyl     Ma—methallyl All other symbols are conventional in so far as they are not otherwise defined in the preceding text.

It is understood that the class and subclass are independent of X, and compounds of each and every subclass can have any substituent X within the scope defined heretofore.

CLASS I

| Subclass | A1 | A2 | A3 | B1 | B2 | B3 | A1 | A2 | A3 | B1 | B2 | B3 |
|---|---|---|---|---|---|---|---|---|---|---|---|---|
| $R^1$ | —H | —CF$_3$ | —Cl | —F | —Me | —Et | —iPr | —H | —OBu | —CF$_3$ | —OME | —Cl |
| $R^2$ | —CF$_3$ | —H | —H | —F | —Cl | —Me | —OMe | —H | —OEt | —H | —H | —H |
| $R^3$ | —H | —CF$_3$ | —Cl | —H | —H | —H | —Et | —Pr | —CF$_3$ | —OPr | —OiPr | —F |
| $R^4$ | —OEt | —H | —OiPr | —H | —Me | —H | —Cl | —F | —iPr | —CF$_3$ | —BU | —H |
| $R^5$ | —H | —H | —F | —Me | —Et | —Pr | —iPr | —Bu | —OMe | —OEt | —OPr | —OBu |
| $R^6$ | —OiPr | —OEt | —Bu | —Pr | —Et | —H | —Me | —F | —Cl | —H | —H | —H |
| $R^7$ | —Me | —Et | —Pr | —iPr | —Bu | —H | —Cl | —OMe | —OEt | —OPr | —OBu | —F |
| $R^8$ | | | | | | | | | | | | |
| X | —NH$_2$ | —NHEt | —N(Me)$_2$ |  | | | | | | | | |
| Group | a | b | c | c | d | d | d | e | e | e | f | f |
| r | | | | | 2 | 3 | 4 | | | | | |
| s | | | | | | | | 1 | 2 | 3 | 1 | 2 |

| Subclass | A1 | A2 | A3 | B1 | B2 | B3 | A1 | A2 | A3 | B1 | B2 | B3 |
|---|---|---|---|---|---|---|---|---|---|---|---|---|
| $R^1$ | —Cl | —H | —H | —Cl | —F | —Me | —Et | —iPr | —H | —OBu | —CF$_3$ | —OMe |
| $R^2$ | —H | —H | —Cl | —F | —Cl | —Me | —OMe | —H | —OEt | —H | —H | —H |
| $R^3$ | —Cl | —H | —H | —H | —H | —Et | —Pr | —CF$_3$ | —OiPr | —OPr | —F | —Cl |
| $R^4$ | —Cl | —H | —Cl | —H | —Cl | —F | —iPr | —H | —Bu | —H | —Cl | —H |
| $R^5$ | —H | —H | —Cl | —iPr | —Bu | —OMe | —OEt | —OPr | —OBu | —H | —H | —Cl |
| $R^6$ | —H | —H | —H | —F | —Cl | —H | —H | —H | —H | —F | —Cl | —Me |
| $R^7$ | —H | —OiPr | —Cl | —F | —H | —Me | —OEt | —Bu | —H | —Cl | —H | —F |
| $R^8$ | | —H | —H | —H | —Me | —Et | —Pr | | | | | |
| X | | | | | | | | —NH$_2$ | —NHMe | —NH$_2$ | —NH$_2$ | —NH$_2$ |
| Group | f | g | g | g | g | g | g | a | b | a | a | a |
| r | | | | | | | | | | | | |
| s | 3 | 1 | 2 | 3 | 1 | 2 | 3 | | | | | |

CLASS II

| Subclass | A1 | A2 | A3 | B1 | B2 | B3 | A1 | A2 | A3 | B1 | B2 | B3 |
|---|---|---|---|---|---|---|---|---|---|---|---|---|
| $R^1$ | —H | —CF$_3$ | —Cl | —F | —Me | —Et | —iPr | —H | —OBu | —CF$_3$ | —OMe | —Cl |
| $R^2$ | —CF$_3$ | —H | —H | —F | —Cl | —Me | —OMe | —H | —OEt | —H | —H | —H |
| $R^3$ | —H | —CF$_3$ | —Cl | —H | —H | —H | —Et | —Pr | —CF$_3$ | —OPr | —OiPr | —F |
| $R^4$ | —OEt | —H | —OiPr | —H | —Me | —H | —Cl | —F | —iPr | —CF$_3$ | —Bu | —H |
| $R^7$ | —Cl | —OMe | —OEt | —OPr | —OBu | —F | —H | —OiPr | —Cl | —F | —H | —Me |
| $R^8$ | | | | | | | | | | | | |
| X | —NH$_2$ | —NH$_2$ | —NHEt | —N(Me)$_2$ | 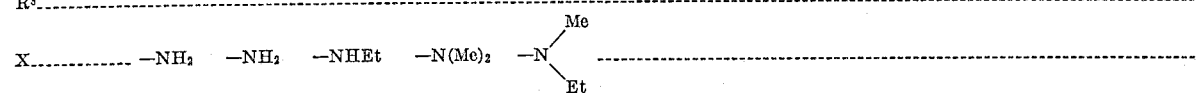 | | | | | | | |
| Group | a | a | b | c | c | d | d | d | e | e | e | f |
| r | | | | | | 2 | 3 | 4 | | | | |
| s | | | | | | | | | 1 | 2 | 3 | 1 |

| Subclass | A1 | A2 | A3 | B1 | B2 | B3 | A1 | A2 | A3 | B1 | B2 | B3 |
|---|---|---|---|---|---|---|---|---|---|---|---|---|
| $R^1$ | —CF$_3$ | —Cl | —F | —Me | —Et | —iPr | —H | —OBu | —CF$_3$ | —OMe | —Cl | —H |
| $R^2$ | —F | —Cl | —Me | —OMe | —H | —OEt | —H | —H | —H | —CF$_3$ | —H | —H |
| $R^3$ | —H | —Et | —Pr | —CF$_3$ | —OPr | —OiPr | —F | —H | —OiPr | —Cl | —H | —Cl |
| $R^4$ | —iPr | —iPr | —CF$_3$ | —Bu | —H | —OEt | —H | —OiPr | —H | —Me | —Bu | —H |
| $R^7$ | —OEt | —Bu | —H | —Cl | —H | —H | —F | —Me | —Et | —Pr | —iPr | —H |
| $R^8$ | | | —H | —H | —H | —Me | —Et | —Pr | | | | |
| X | | | | | | | | | —NH$_2$ | —NHMe | —NH$_2$ | —NH$_2$ |
| Group | f | f | g | g | g | g | g | g | a | b | a | a |
| r | | | | | | | | | | | | |
| s | 2 | 3 | 1 | 2 | 3 | 1 | 2 | 3 | | | | |

CLASS III

| Subclass | A1 | A2 | A3 | B1 | B2 | B3 | A1 | A2 | A3 | B1 | B2 | B3 |
|---|---|---|---|---|---|---|---|---|---|---|---|---|
| $R$ | —Me | —H | —Bu | —Al | —Pp | —Pr | —Pp | —Me | —Ma | —H | —iPr | —Et |
| $R^5$ | —H | —Cl | —F | —Me | —Et | —Pr | —iPr | —Bu | —OMe | —OEt | —OPr | —OPr |
| $R^6$ | —OiPr | —OEt | —Bu | —Pr | —Et | —H | —Me | —F | —Cl | —H | —H | —H |
| $R^7$ | —H | —OiPr | —Cl | —F | —H | —Me | —OEt | —Bu | —H | —Cl | —H | —F |
| $R^8$ | | | | | | | | | | | | |
| X | —NH$_2$ | —NH$_2$ | —NH$_2$ | —NHEt | —N(Me)$_2$ | 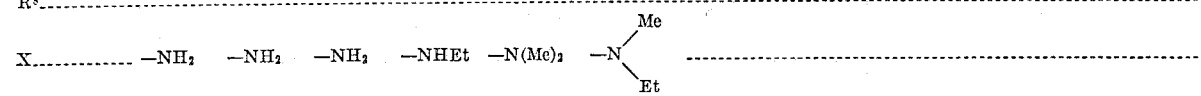 | | | | | | |
| Group | a | a | a | b | c | c | d | d | d | e | e | e |
| r | | | | | | | 2 | 3 | 4 | | | |
| s | | | | | | | | | | 1 | 2 | 3 |

| Subclass | A1 | A2 | A3 | B1 | B2 | B3 | A1 | A2 | A3 | B1 | B2 | B3 |
|---|---|---|---|---|---|---|---|---|---|---|---|---|
| $R$ | —Me | —H | —Bu | —Al | —Pp | —Pr | —Pp | —Me | —Ma | —H | —iPr | —Et |
| $R^5$ | —H | —H | —H | —Cl | —F | —Me | —H | —Et | —Pr | —Bu | —OEt | —OiPr |
| $R^6$ | —H | —Cl | —F | —Me | —Et | —Pr | —iPr | —Bu | —OMe | —OEt | —OPr | —OBu |
| $R^7$ | —Me | —Et | —Pr | —iPr | —Bu | —H | —Cl | —Me | —OEt | —OPr | —OBu | —F |
| $R^8$ | | | | —H | —H | —H | —Me | —Et | —Pr | | | |
| X | | | | | | | | | | —NH$_2$ | —NHMe | —NH$_2$ |
| Group | f | f | f | g | g | g | g | g | g | a | b | a |
| r | | | | | | | | | | | | |
| s | 1 | 2 | 3 | 1 | 2 | 3 | 1 | 2 | 3 | | | |

CLASS IV

| Subclass | A1 | A2 | A3 | B1 | B2 | B3 | A1 | A2 | A3 | B1 | B2 | B3 |
|---|---|---|---|---|---|---|---|---|---|---|---|---|
| R | —Pp | —Pr | —Pp | —Me | —Ma | —H | —iPr | —Et | —Me | —H | —Bu | —Al |
| $R^7$ | —OEt | —Bu | —H | —Cl | —H | —F | —Me | —Et | —Pr | —iPr | —Bu | —H |
| $R^8$ | | | | | | | | | | | | |
| X | —$NH_2$ | —$NH_2$ | —$NH_2$ | —$NH_2$ | —NHEt | —N(Me)$_2$ | —N(Me)(Et) | | | | | |
| Group | a | a | a | a | b | c | c | d | d | d | e | e |
| r | | | | | | | | | | | | |
| s | | | | | | | | 2 | 3 | 4 | 1 | 2 |

| Subclass | A1 | A2 | A3 | B1 | B2 | B3 | A1 | A2 | A3 | B1 | B2 | B3 |
|---|---|---|---|---|---|---|---|---|---|---|---|---|
| R | —Pp | —Pr | —Pp | —Me | —Ma | —H | —iPr | —Et | —Me | —H | —Bu | —Al |
| $R^7$ | —Cl | —OMe | —OEt | —OPr | —OBu | —F | —H | —OiPr | —Cl | —F | —H | —Me |
| $R^8$ | | | | —H | —H | —H | —H | —Me | —Et | —Pr | | |
| X | | | | | | | | | | | —$NH_2$ | —NHMe |
| Group | e | f | f | f | g | g | g | g | g | g | a | b |
| r | | | | | | | | | | | | |
| s | 3 | 1 | 2 | 3 | 1 | 2 | 3 | 1 | 2 | 3 | | |

The preparation of compounds I, II, III and IV is accomplished by either of two procedures. As a preliminary step of each procedure is reaction A

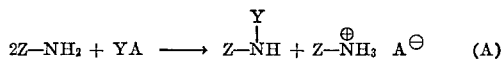

wherein Z is either

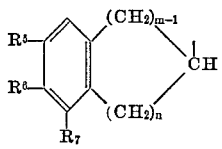

or

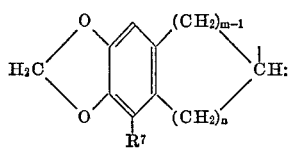

Y is either R or 2-$R^1$-, 3-$R^2$-, 4-$R^3$-, 5-$R^4$-benzyl;
A is either a chlorine atom (—Cl) or a bromine atom (—Br); and
each of R, $R^1$, $R^2$, $R^3$, $R^4$, $R^5$, $R^6$, $R^7$, m and n has its above ascribed meaning.

This reaction is effected in an inert solvent medium at a temperature from room temperature (20° C.) to the boiling point (B.P.) of the solvent. It is important that the solvent be inert to both the reactants and the reaction products. Exemplary inert solvents are benzene, toluene and diethyl ether.

For the preparation of those compounds I, II, III and IV wherein X is either primary or secondary amino (groups a and b), reaction B is preferably employed.

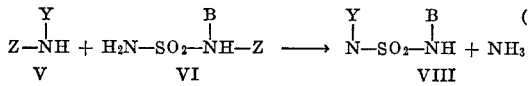

wherein B is either a hydrogen atom or lower alkyl, e.g. methyl; and each of Z and Y has its above-ascribed meaning.

Reaction B is accomplished by heating amine V and sulfamide VI in a tertiary amine medium at a temperature within the range of from about 50° to about 250° C., preferably from about 55° to 125° C. and usually at the reflux temperature of the system.

The tertiary amine medium provides a solvent system in which the reaction takes place. Contemplated tertiary amines include, for example, tri(lower)alkylamines, e.g. triethylamine; (lower)alkyl pyridines, e.g. 3-ethylpyridine; (lower)alkoxy pyridines, e.g. 2,5-dimethoxypyridine; quinoline; (lower)alkyl quinolines, e.g. 8-ethylquinoline; N-(lower)-alkyl morpholine, e.g. N-methylmorpholine; and N,N'-di(lower)alkyl piperazine, e.g. N-methyl-N'-ethylpiperazine.

For the preparation of those compounds I, II, III and IV wherein X is tertiary amino, reaction C is preferably employed.

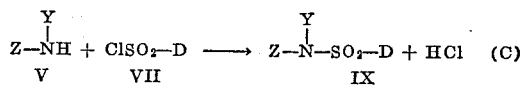

wherein D is X for groups c, d, e, f and g; and each of Y and Z has its above-ascribed meaning.

Reaction C is effected in an inert medium at room temperature with agitation. Exemplary solvents are benzene, toluene and diethyl ether.

For reactions A, B and C all reactants are either well-known or are readily prepared by methods readily apparent to the art-skilled.

The preferred compounds of classes I, II, III and IV are those having chloro-substituted aryl rings. Of classes III and IV the preferred compounds are those wherein R is propargyl. In all four classes those compounds wherein X is primary amino (—$NH_2$) are preferred.

Compounds I, II, III and IV have central nervous system (CNS) activity. They are useful as sedatives, sedative-tranquilizers, anticonvulsants and analgesics. N-2-indanylsulfamide, e.g., is useful as a sedative-tranquilizer and as an anticonvulsant, whereas N-(2,4-dichlorobenzyl)-N-1-indanyl sulfamide is useful as a sedative; and N-(1,2,3,4-tetrahydronaphthyl)sulfamide and N-(1-indanyl)sulfamide are useful as sedative-tranquilizers, anticonvulsants and analgesics.

Said compounds I, II, II and IV may be administered either orally or parenterally. Oral dosage forms include tablets and capsules having standard fillers and other compounding constituents. The average daily dose may vary within the range of from 150 milligrams to 250 milligrams.

Each of the pharmaceutically active compounds of this invention may be, e.g., incorporated, for oral administration, in a tablet as the sole active ingredient. A typical tablet is constituted by from 1 to 3 percent binder, e.g. tragacanth; from 3 to 10 percent disintegrating agent, e.g. cornstarch; from 2 to 10 percent lubricant, e.g. talcum from 0.25 to 1.0 percent lubricant, e.g. magnesium stearate; an average dosage of active ingredient; and q.s. 100 percent of filler, e.g. lactose; all percentages being by weight. Tablets are prepared according to standard tabletting techniques, which are well-known to the art, employing the necessary amounts of conventional granulating liquids, e.g. alcohol SD–30 and purified water. An exemplary tabletting formulation for the instant active compounds is:

| | Parts |
|---|---|
| Title compound of Example 2 | 33 |
| Tragacanth | 2 |
| Lactose | 56.5 |
| Corn starch | 5 |
| Talcum | 3 |
| Magnesium stearate | 0.5 |
| Alcohol SD-30, q.s. | |
| Purified water, q.s. | |

The following examples illustrate the invention, all temperatures being in degrees centigrade, the parts and percentages beinng by weight unless otherwise specified, and the relationship between parts by weight and parts by volume being the same as that between the kilogram and the liter.

Example 1

N-2-Indanylsulfamide

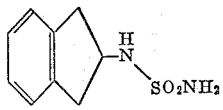

Charge a flask with 8.5 parts (0.05 mole) of 2-aminoindane hydrochloride, 2.8 parts (0.05 mole) of potassium hydroxide, 9.6 parts (0.10 mole) of sulfamide, 10 parts by volume of water and 90 parts by volume of ethanol. Stir and reflux the resulting admixture for about fifteen hours. On cooling a crystalline material separates. Filter off the crystalline material and crystallize same from ethanol-water. There are thus obtained 4.2 parts of title compound. Melting point (M.P.) 151° to 152°.

Example 2

N-(2,4-dichlorobenzyl)-N-1-indanyl sulfamide

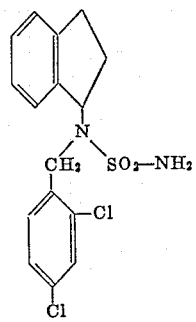

Charge a flask with 14.7 parts (0.05 mole) of N-(2,4-dichlorobenzyl)-1-aminoindane, 6.7 parts (0.07 mole) of sulfamide and 150 parts by volume of pyridine. Stir and reflux the resulting admixture for about fifteen hours. Cool to room temperature (20°). During the cooling a crystalline material separates. Filter off the crystalline material and crystallize same from ethanol-water. There are thus obtained 5.0 parts of N-(2,4-dichlorobenzyl)-N-1-indanyl sulfamide, M.P. 154° to 155°.

Example 3

N-(1-1,2,3,4-tetrahydronaphthyl)sulfamide

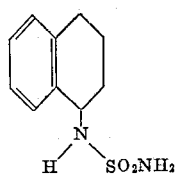

Charge a flask with 11.0 parts (0.075 mole) of 1-amino-tetralin, 7.6 parts (0.08 mole) of sulfamide, 150 parts by volume of water and 50 parts by volume of ethanol. Stir and reflux the resulting admixture for about fifteen hours. Cool to room temperature. During the cooling a crystalline material separates. Filter off the crystalline material and crystallize same from ethanol-water. There are thus obtained 2.0 parts of N-(1-1,2,3,4-tetrahydronaphthyl)sulfamide, M.P. 99.5° to 100°.

Example 4

N-(1-indanyl)sulfamide

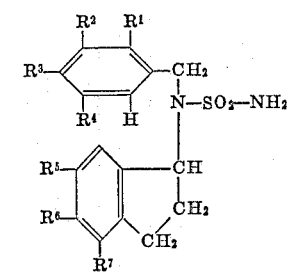

Charge a flask with 13.3 parts (0.10 mole) of 1-aminoindane, 9.6 parts (0.10 mole) of sulfamide, 200 parts by volume of water and 75 parts by volume of ethanol. Stir and reflux the resulting admixture for about fifteen hours. Cool to room temperature. During cooling a crystalline material separates. Filter off the crystalline material and crystallize same from ethanol-water. There are thus obtained 5.2 parts of N-(1-indanyl)sulfamide, M.P. 115° to 116°.

What is claimed is:

1. A compound of the formula wherein each of $R^1$, $R^2$, $R^3$ and $R^4$ is a member selected from the group consisting of a hydrogen atom, a chlorine atom, a fluorine atom, lower alkyl, lower alkoxy and trifluoromethyl, no two trifluoromethyl groups being ortho to each other;
each of $R^5$, $R^6$, and $R^7$ is a member selected from the group consisting of a hydrogen atom, a chlorine atom, a fluorine atom, lower alkyl and lower alkoxy; and $m$ represents 1 or 2.

2. A compound of the formula where each of $R^1$, $R^2$, $R^3$ and $R^4$ is a member selected from the group consisting of a hydrogen atom, a chlorine atom, a fluorine atom, lower alkyl, lower alkoxy and trifluoromethyl, no two trifluoromethyl groups being ortho to each other; and
each of $R^5$, $R^6$, and $R^7$ is a member selected from the group consisting of a hydrogen atom, a chlorine atom, a fluorine atom, lower alkyl and lower alkoxy.
3. The compound of the formula
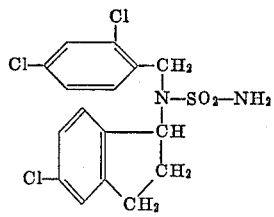
4. The compound of the formula
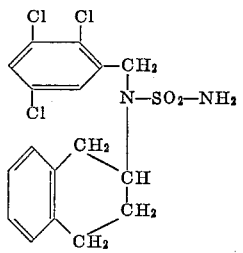
5. A compound of the formula
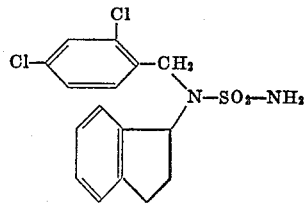
References Cited
UNITED STATES PATENTS
3,173,579   8/1967   Lafferty _____ 260—326.82
NICHOLAS S. RIZZO, *Primary Examiner.*
ALTON D. ROLLINS, *Examiner.*
B. DENTZ, *Assistant Examiner.*